United States Patent
Motozawa (10) Patent No.: US 6,592,166 B2
(45) Date of Patent: Jul. 15, 2003

(54) VEHICLE OCCUPANT SIDE CRASH PROTECTION SYSTEM

(75) Inventor: Yasuki Motozawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/171,310

(22) Filed: Jun. 11, 2002

(65) Prior Publication Data

US 2002/0195832 A1 Dec. 26, 2002

(30) Foreign Application Priority Data

Jun. 12, 2001 (JP) ........................................ 2001-177094

(51) Int. Cl.[7] .............................. B60R 21/02; B60N 2/06
(52) U.S. Cl. .................... 296/68.1; 296/65.12; 296/189; 297/216.16; 297/216.1
(58) Field of Search ............................. 296/68.1, 65.02, 296/188, 189, 65.11, 65.12; 297/216.1, 216.16, 216.18

(56) References Cited

U.S. PATENT DOCUMENTS

| | | | |
|---|---|---|---|
| 2,193,949 A | 3/1940 | Tibbetts | 296/28 |
| 2,959,446 A | 11/1960 | Thompson | 296/65 |
| 2,965,403 A | 12/1960 | Barenyi et al. | 293/63 |
| 3,001,815 A | 9/1961 | Weber | 296/65 |
| 3,732,944 A | 5/1973 | Kendall | 180/103 |
| 3,831,997 A | 8/1974 | Myers | 296/28 R |
| 3,848,886 A | 11/1974 | Feustel et al. | 280/106 R |
| 3,871,470 A | 3/1975 | Schwanz et al. | 180/82 C |
| 3,897,101 A | 7/1975 | Hess | 296/65 A |
| 3,912,295 A | 10/1975 | Eggert, Jr. | 280/106 R |
| 3,961,805 A | 6/1976 | Satzinger | 280/747 |
| 3,992,046 A * | 11/1976 | Braess | 296/65 A |
| 3,998,291 A * | 12/1976 | Davis | 180/91 |
| 4,008,909 A | 2/1977 | Otani et al. | 280/746 |
| 4,152,012 A * | 5/1979 | Reidelbach et al. | 280/784 |
| 4,156,472 A * | 5/1979 | Kunz | 177/25 |
| 4,317,584 A | 3/1982 | Takata | 280/804 |
| 4,413,856 A * | 11/1983 | McMahan et al. | 296/188 |
| 4,458,921 A | 7/1984 | Chiba et al. | 280/806 |

(List continued on next page.)

FOREIGN PATENT DOCUMENTS

| | | | |
|---|---|---|---|
| DE | 3420397 A1 | 12/1985 | |
| DE | 3424-928 A1 | 1/1986 | |
| DE | 4212091 A1 * | 10/1993 | B60N/2/06 |
| DE | 4323543 C1 | 10/1994 | |

(List continued on next page.)

OTHER PUBLICATIONS

U.S. application Ser. No. 10/005,739 filed Nov. 6, 2001, 25 pages.
U.S. application Ser. No. 10/170,279 filed Jun. 11, 2002, 25 pages.
U.S. application Ser. No. 10/171,309 filed Jun. 11, 2002, 20 pages.

(List continued on next page.)

Primary Examiner—D. Glenn Dayoan
Assistant Examiner—Patricia Engie
(74) Attorney, Agent, or Firm—MacPherson Kwok Chen & Heid LLP (57) ABSTRACT

A vehicle seat is mounted on a floor in a laterally inwardly moveable manner, and is accelerated by a power actuator inwardly upon detection of a vehicle side crash. The vehicle occupant is firmly held to the seat. By thus appropriately controlling the time history of the lateral acceleration of the vehicle occupant at the time of a side crash, the maximum acceleration acting on the vehicle occupant can be controlled. The inward movement of the seat provides a wider space between the vehicle occupant and door panel, and this contributes to the prevention of the injury to the vehicle occupant owing to the intrusion of the door panel into the passenger compartment at the time of a side crash.

8 Claims, 6 Drawing Sheets

U.S. PATENT DOCUMENTS

| | | | |
|---|---|---|---|
| 4,702,515 A * | 10/1987 | Kato et al. | 296/189 |
| 4,832,409 A * | 5/1989 | Borlinghaus et al. | 297/468 |
| 4,881,781 A * | 11/1989 | Borlinghaus et al. | 297/473 |
| 4,901,500 A * | 2/1990 | Wycech | 52/793 |
| 5,033,593 A * | 7/1991 | Kazuhito | 188/377 |
| 5,040,646 A * | 8/1991 | Drefahl | 188/371 |
| 5,048,888 A | 9/1991 | Willy et al. | 296/189 |
| 5,123,673 A * | 6/1992 | Tame | 280/801.1 |
| 5,167,421 A | 12/1992 | Yunzhao | 297/216 |
| 5,201,912 A | 4/1993 | Terada et al. | 293/120 |
| 5,224,574 A | 7/1993 | Thum | 188/371 |
| 5,244,248 A | 9/1993 | Bovellan | 296/194 |
| 5,286,085 A | 2/1994 | Minami | 297/250.1 |
| 5,409,262 A | 4/1995 | McLennan | 280/784 |
| 5,429,388 A | 7/1995 | Wheatley et al. | 280/784 |
| 5,437,494 A | 8/1995 | Beauvais | 297/216.19 |
| 5,552,986 A | 9/1996 | Omura et al. | 364/424.05 |
| 5,566,777 A | 10/1996 | Trommer et al. | 180/232 |
| 5,626,203 A | 5/1997 | Habib | 180/274 |
| 5,636,424 A | 6/1997 | Singer et al. | 29/407.01 |
| 5,681,057 A | 10/1997 | Whirley et al. | 280/784 |
| 5,685,603 A | 11/1997 | Lane, Jr. | 297/216.11 |
| 5,746,467 A | 5/1998 | Jesadanot | 296/68.1 |
| 5,785,347 A | 7/1998 | Adolph et al. | 280/735 |
| 5,794,978 A | 8/1998 | Nishide | 280/806 |
| 5,810,417 A | 9/1998 | Jesadanot | 296/68.1 |
| 5,853,195 A | 12/1998 | Le et al. | 280/784 |
| 5,876,077 A | 3/1999 | Miskech et al. | 293/132 |
| 5,876,078 A | 3/1999 | Miskech et al. | 293/133 |
| 5,911,433 A * | 6/1999 | Swann | 280/730.2 |
| 5,947,543 A | 9/1999 | Hubbard | 296/68.1 |
| 5,984,357 A | 11/1999 | Yasuda et al. | 280/806 |
| 5,984,402 A * | 11/1999 | Takeuchi | 296/188 |
| 6,003,934 A | 12/1999 | Usui | 296/203.02 |
| 6,003,937 A | 12/1999 | Dutton et al. | 297/216.1 |
| 6,042,190 A | 3/2000 | Mathe et al. | 297/483 |
| 6,068,329 A | 5/2000 | Miller | 296/189 |
| 6,092,853 A | 7/2000 | Hubbard | 296/68.1 |
| 6,116,561 A | 9/2000 | Christopher | 248/429 |
| 6,170,865 B1 | 1/2001 | Barron | 280/735 |
| 6,179,370 B1 * | 1/2001 | Takeuchi | 296/188 |
| 6,186,574 B1 | 2/2001 | Motozawa et al. | 296/68.1 |
| 6,193,296 B1 | 2/2001 | Motozawa et al. | 296/68.1 |
| 6,203,098 B1 | 3/2001 | Motozawa et al. | 296/189 |
| 6,224,131 B1 | 5/2001 | Shammout | 296/68.1 |
| 6,227,563 B1 | 5/2001 | Talisman | 280/735 |
| 6,227,597 B1 | 5/2001 | Swann et al. | 296/68.1 |
| 6,237,991 B1 * | 5/2001 | Weber | 296/188 |
| 6,241,280 B1 * | 6/2001 | Biewendt et al. | 280/735 |
| 6,254,164 B1 | 7/2001 | Kawamura et al. | 296/68.1 |
| 6,299,238 B1 * | 10/2001 | Takagi et al. | 296/188 |
| 6,299,239 B1 * | 10/2001 | Sagawa et al. | 296/188 |
| 6,394,535 B1 | 5/2002 | Kawamura et al. | 296/189 |
| 6,398,292 B2 | 6/2002 | Tsuruta et al. | 296/189 |
| 6,419,271 B1 | 7/2002 | Yamada et al. | 280/806 |
| 6,422,632 B1 | 7/2002 | Kamei et al. | 296/68.1 |
| 2001/0028186 A1 * | 10/2001 | Koyanagi et al. | 297/250.1 |

FOREIGN PATENT DOCUMENTS

| | | | | |
|---|---|---|---|---|
| DE | 4415467 C1 | | 11/1995 | |
| DE | 19516013 A1 | * | 5/1996 | B60N/2/06 |
| DE | 19938940 A1 | | 3/2000 | |
| GB | 1043695 | | 9/1966 | |
| GB | 2304651 A | | 3/1997 | |
| GB | 2340801 A | | 3/2000 | |
| GB | 2340802 A | | 3/2000 | |
| JP | 58-89475 A | | 5/1983 | |
| JP | 58-116268 A | * | 7/1983 | |
| JP | 4-310477 A | * | 11/1992 | |
| JP | 5-12361 U | * | 2/1993 | |
| JP | 5-238287 A | * | 9/1993 | |
| JP | 5-246252 A | * | 9/1993 | |
| JP | 5-246253 A | | 9/1993 | |
| JP | 7-101354 A | | 4/1995 | |
| JP | 07-101354 | | 4/1995 | |
| JP | 7-205733 A | | 8/1995 | |
| JP | 10166918 A | * | 6/1998 | B60N/2/42 |
| JP | 2000-62556 A | | 2/2000 | |
| JP | 2000-62557 A | | 2/2000 | |
| WO | WO 91/14110 | | 9/1991 | |
| WO | WO 94/22692 | | 10/1994 | |
| WO | WO 96/04154 | | 2/1996 | |
| WO | WO 98/40238 | | 9/1998 | |
| WO | WO 99/62747 | | 12/1999 | |

OTHER PUBLICATIONS

English Language Abstract, DE3424928, Jan. 16, 1986.*
Translation of Parts, DE4323543C1, Oct. 6, 1994.*
English Language Abstract and Translation of Abstract and Claims 1 and 5–9, DE4415467C1, Nov. 23, 1995.*
English Language Abstract, DE19938940, Mar. 2, 2000.
Patent Abstracts of Japan, 58–89475, May 27, 1983.
English Language Abstract of 58–116268, Jul. 11, 1983.
Patent Abstracts of Japan, 4–310477, Nov. 2, 1992.
English Language Abstract, 5–12361, Feb. 19, 1993.
English Language Abstract, 5–238287, Sep. 17, 1993.
English Language Abstract, 5–246252, Sep. 24, 1993.
English Language Abstract, 5–246253, Sep. 24, 1993.
Patent Abstracts of Japan, 7–101354, Apr. 18, 1995.
Patent Abstract of Japan, 7–205733, Aug. 8, 1995.
Patent Abstracts of Japan, 2000–062556, Feb. 29, 2000.
Patent Abstracts of Japan, 2000–062557, Feb. 29, 2000.

* cited by examiner

VEHICLE OCCUPANT SIDE CRASH PROTECTION SYSTEM

CROSS REFERENCE TO RELATED PATENTS (PATENT APPLICATIONS)

Reference should be made to the following commonly assigned prior patents (copending patent applications), and the contents of these patents (patent applications) are hereby incorporated in this application by reference.

| Our Ref: | Patent (Application) No. | Issue (Application) Date |
|---|---|---|
| F650 | 6,193,296 | Feb. 27, 2001 |
| F651 | 6,1865,74 | Feb. 13, 2001 |
| F655 | 6,2030,98 | Mar. 20, 2001 |
| F685 | 6,2541,64 | Jul. 03, 2001 |
| F686 | 6,394,535 | May. 28, 2002 |
| F687 | 6,422,632 | Jul. 23, 2002 |
| F716 | 6,398,292 | Jun. 04, 2002 |
| F781 | 10/005,739 | Nov. 06, 2001 |
| F818 | 10/170,279 | Jun. 11, 2002 |
| F819 | 10/171,309 | Jun. 11, 2002 |

TECHNICAL FIELD

The present invention relates to a vehicle occupant protection system, and in particular to a vehicle occupant protection system for protecting the vehicle occupant from the impact of a side crash.

BACKGROUND OF THE INVENTION

In recent years, to the end of improving the protection of the occupant of a motor vehicle from the impact of a side crash, various vehicle body structures have been proposed which minimize the deceleration of the passenger compartment and prevent the deformation of the vehicle body from reaching the passenger compartment by appropriately controlling the deformation mode of the part (crushable zone) of the vehicle body other than the passenger compartment (see Japanese patent laid open publication No.7-101354).

According to such a conventional vehicle body structure, the crushable zone for absorbing the impact of a frontal crash can be provided by the length of the engine room, but the crushable zone for the impact of a side crash cannot be adequately provided by the thickness of the door. Therefore, it has been practiced to provide a reinforcing bar inside the door to prevent the deformation of the door from affecting the passenger compartment as a measure against a side crash.

However, because such a conventional measure against a side crash is based on the prevention of the deformation of the door so as to prevent the door from intruding into the passenger compartment, it inevitably detracts from the absorption of the impact acting upon the vehicle body, and is unable to adequately prevent the vehicle occupant from moving toward the door under the acceleration acting on the vehicle body.

BRIEF SUMMARY OF THE INVENTION

In view of such problems of the prior art, a primary object of the present invention is to provide a vehicle occupant protection system which can favorably control the impact to the vehicle occupant at the time of a side crash.

A second object of the present invention is to provide a vehicle occupant protection system which prevents the vehicle occupant from colliding with the door at the time of a vehicle side crash.

A third object of the present invention is to provide a vehicle occupant protection system which can be fitted within a limited available space around the seat of the vehicle occupant.

According to the present invention, such objects can be accomplished by providing a vehicle occupant protection system, comprising a seat fitted with a seat belt for restraining a vehicle occupant and laterally moveably supported by a floor, said seat belt having two ends attached to the seat; a power actuator for accelerating the seat laterally toward a central part of the vehicle body upon detection of a side crash; and brake means for applying an opposite force to the seat after it has traveled a certain distance toward the central part of the vehicle body.

Thus, owing the operation of the power actuator, the acceleration acting on the seat rises before the acceleration acting on the vehicle body does during an early phase of a vehicle crash. Thereafter, the velocity (deceleration) of the seat is equalized to that of the vehicle body during an intermediate phase of the vehicle crash by the brake means. This favorably controls the maximum level of acceleration acting upon the vehicle occupant. The maximum level of acceleration determines the degree of the injury which the vehicle occupant sustains at the time of a vehicle side crash. Furthermore, the seat moves toward the central part of the vehicle body or away from the door panel before the side panel of the vehicle body is pushed into the passenger compartment so that an enlarged space is created between the vehicle occupant and vehicle body. This prevents the injury to the vehicle occupant that could be caused by the collision with the vehicle door panel intruding into the passenger compartment. The power actuator may consist of a piston-cylinder arrangement powered by a propellant.

The seat is preferably provided with a restraining member for restraining the vehicle occupant from moving outwardly with respect to the seat so that the vehicle occupant may be held firmly to the seat and experience the designed time history of acceleration according to the present invention. The restraining member may consist of an armpit belt passed around an upper part of the vehicle occupant and/or an extension of a seat back extending forward from an outboard side thereof.

The brake means may consist of a power actuator, but more preferably consists of a member adapted to undergo a controlled deformation by a part of the seat as it travels toward the central part of the vehicle body. Such a member provides the required braking action in a more economical and simple manner.

To achieve the necessary motion of the vehicle seat at the time of a side crash without interfering with the existing arrangement for the fore-and-aft adjustment of the vehicle seat, the seat may be supported by the floor -via a laterally extending rail which is in turn guided by a longitudinally extending rail attached to the floor for a fore-and-aft adjustment of the seat. In such a case, the power actuator may be attached to the floor if its working end is connected to the seat via a coupling for accommodating the fore-and-aft adjustment of the seat.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
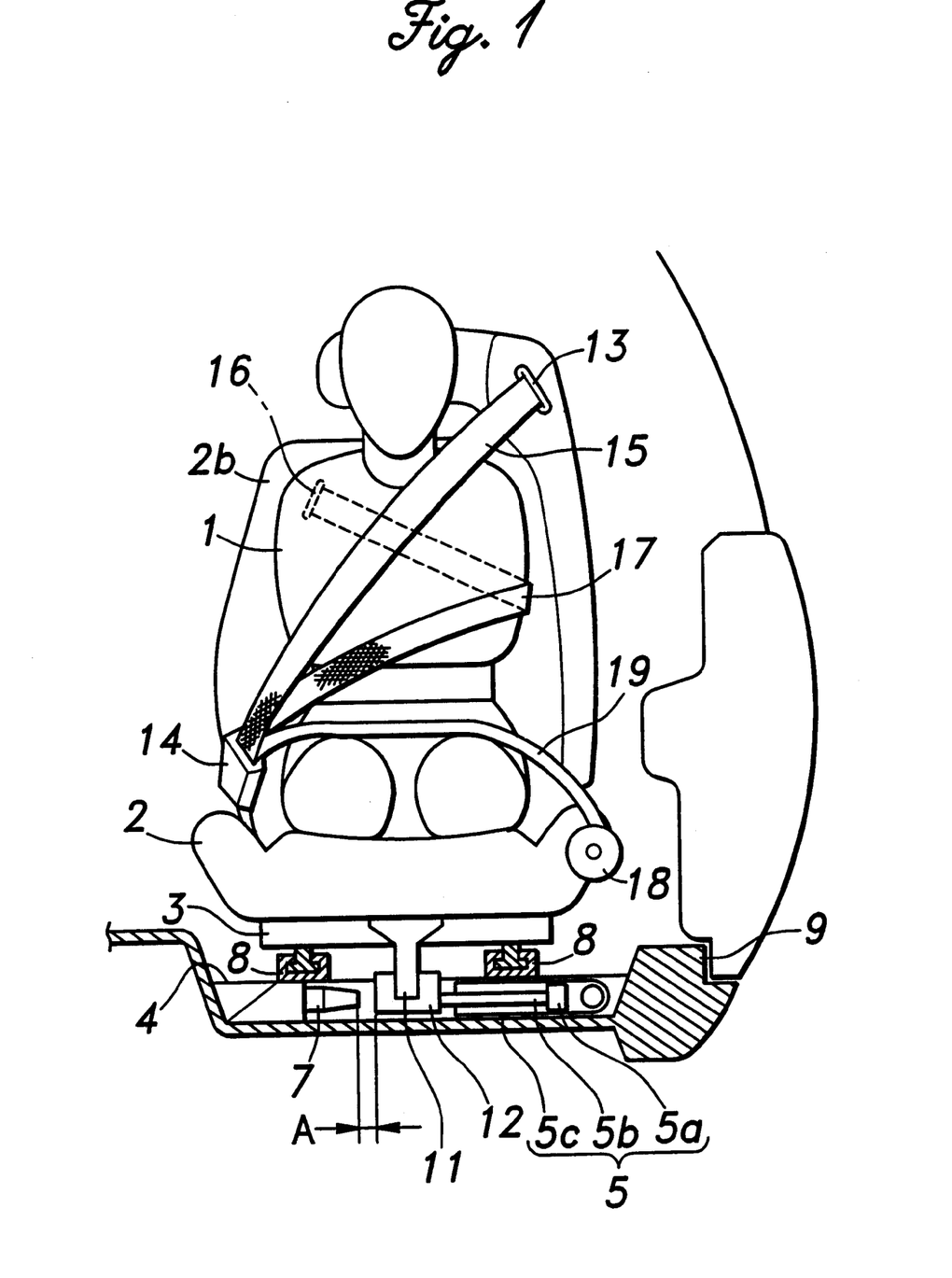
FIG. 1 is a schematic front view showing the structure of a vehicle occupant protection system embodying the present invention.
Figure 2:
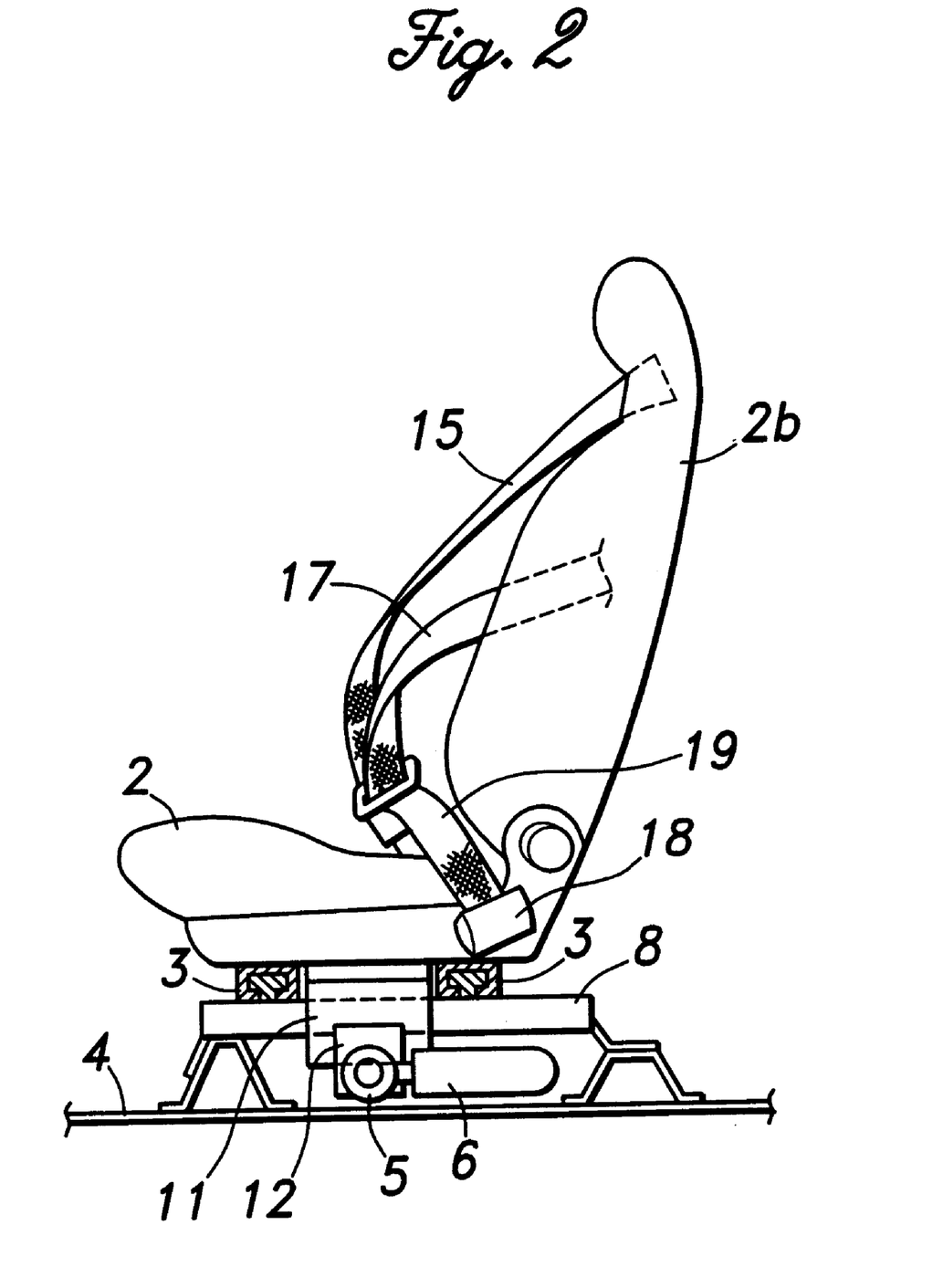
FIG. 2 is a schematic side view showing the structure of the vehicle occupant protection system embodying the present invention.

FIGS. 1 and 2 show a vehicle occupant protection system for a vehicle side crash embodying the present invention. This vehicle occupant protection system comprises a seat 2 incorporated with a seat belt for restraining a vehicle occupant 1 seated in the seat, a pair of lateral slide rails 3 for supporting the seat in a laterally slidable manner, a linear slide actuator 5 placed on the upper surface of a floor 4 and including a piston 5a, a piston rod 5b and a cylinder 5c, a gas generator 6 connected to a bottom end of the linear slide actuator 5 to produce high pressure gas for providing a drive force to the piston 5a of the linear slide actuator 5, and a collapsible tube 7 for a braking action provided opposite to an inboard end surface of a connecting part between the seat 2 and the piston rod 5b of the linear slide actuator 5 defining a gap having a prescribed dimension (A).

The lateral slide rails 3 are directly connected to the lower surface of the seat 2, and are provided with an appropriate retaining mechanism (not shown in the drawing) for normally retaining the seat 2 immobile at an initial position.

The lateral slide rails 3 are supported above the floor via a pair of longitudinal slide rails 8 provided with a suitable locking arrangement for adjusting the fore-and-aft position of the seat 2 according to the build of the vehicle occupant or the choice of the vehicle occupant. The longitudinal slide rails 8 of this embodiment consist of a per se conventional arrangement, and are fixedly attached to the floor 4.

The gas generator 6 contains a known propellant, and is electrically connected to an accelerator sensor (not shown in the drawings) attached to an appropriate part of the vehicle body.

A longitudinal bar 11 having a T-shaped cross section is integrally attached to the lower surface of the seat 2, and is engaged by a U-shaped retaining part 12 which is integrally attached to the output end of the piston rod 5c so that this arrangement would not interfere with the fore-and-aft adjustment function for the seat 2.

The collapsible tube 7 is, for instance, made of a thin-walled steel tube, and is provided with a base end fixedly attached to the upper surface of the floor 4. The property and dimensions of the collapsible tube 7 are determined so that the collapsible tube 7 undergoes a plastic deformation, and produces a prescribed reaction load when hit by the retaining part 12.

The seat 2 is provided with an outer shoulder anchor 13 attached to the seat back 2b adjacent to the door, a shoulder belt 15 extending between the outer shoulder anchor 13 and a buckle 14 attached to the seat bottom adjacent to the central part of the vehicle body, an inner shoulder anchor 16 attached to the seat back 2b adjacent to the central part of the vehicle body, an armpit belt 17 extending between the inner shoulder anchor 16 and the buckle 14, a retractor 18 attached to the seat bottom adjacent to the door, and a lap belt 19 extending between the retractor 18 and the buckle 14. The shoulder belt 15 and lap belt 19 perform the function of retaining the upper part of the vehicle occupant 1 against the deceleration of the vehicle occupant at the time of a frontal crash in a similar manner as a conventional three-point seat belt, and the armpit belt 17 mainly performs the function of retaining the upper part of the vehicle occupant against the acceleration of the vehicle body at the time of a side crash.

Figure 4:
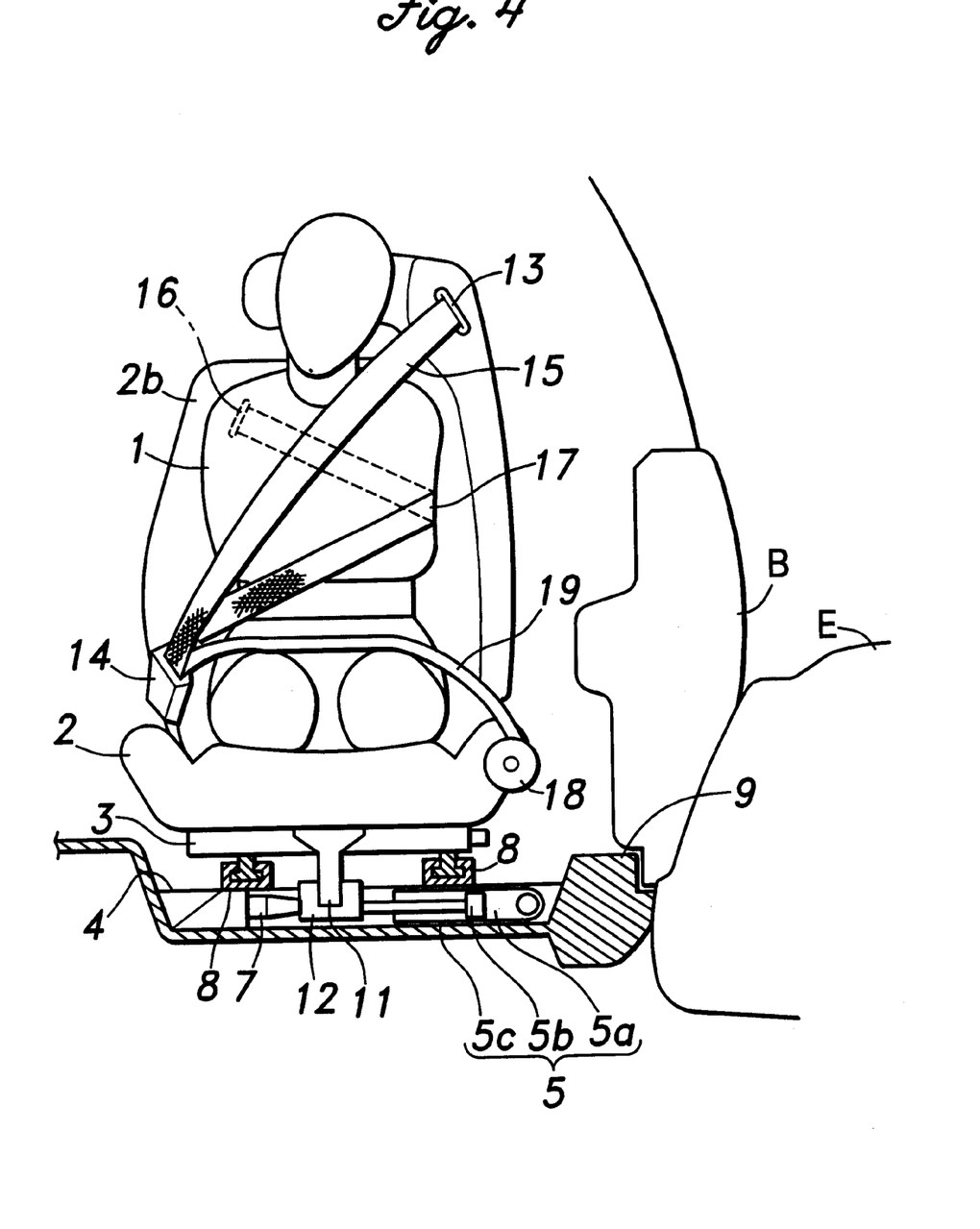
FIG. 4 is a view similar to FIG. 1 showing an intermediate phase of the operation of the system of the present invention.
Figure 5:
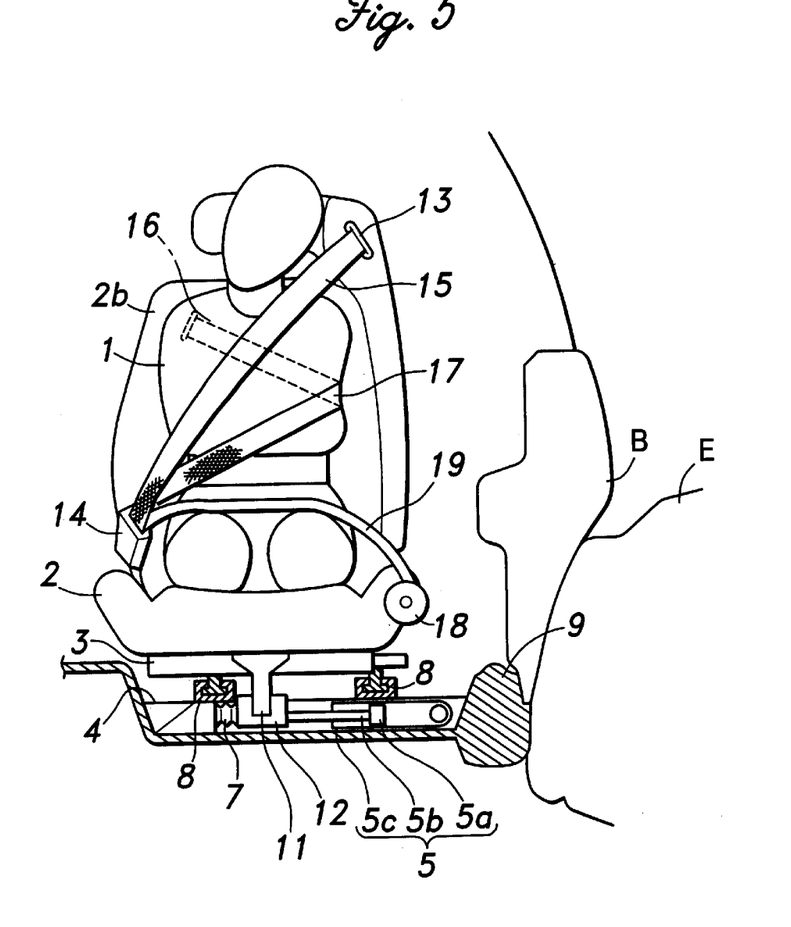
FIG. 5 is a view similar to FIG. 1 showing a final phase of the operation of the system of the present invention.

The mode of operation of the illustrated embodiment of the present invention is described in the following with reference to FIGS. 3 to 5.

Figure 3:
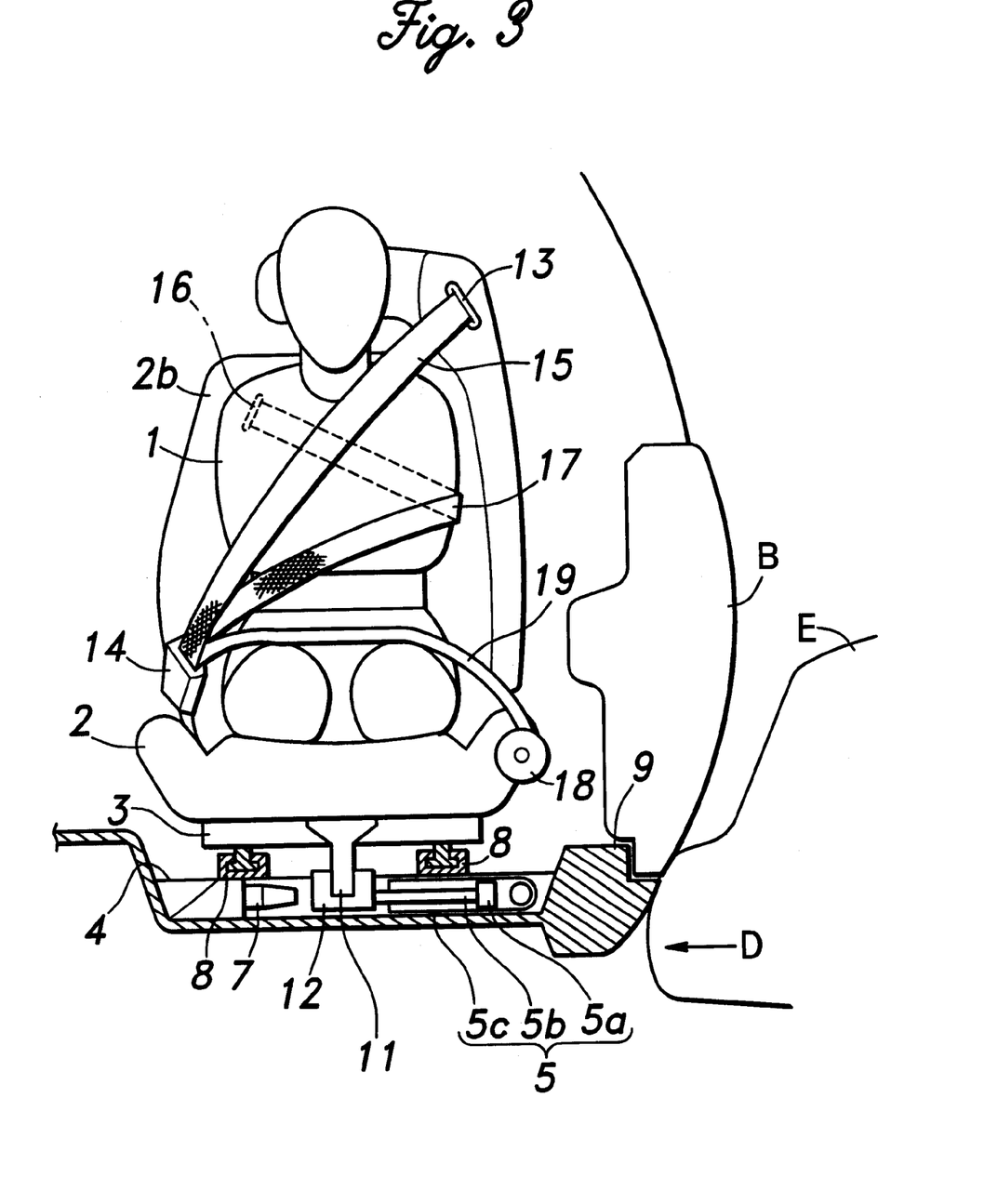
FIG. 3 is a view similar to FIG. 1 showing an early phase of the operation of the system of the present invention.

When a side of a vehicle body (door) B is hit by another vehicle E, the kinetic energy of the other vehicle produces a lateral acceleration of the vehicle body B in the traveling direction D of the other vehicle E (see FIG. 3). The deceleration sensor provided with an electric contact which closes upon detection of the resulting acceleration ignites the propellant incorporated in the gas generator 6, and the produced gas pushes out the piston rod 5b. As a result, the piston rod 5b moves toward the center of the vehicle body B at a higher level of acceleration than the vehicle body B which absorbs the impact load by deforming itself and somewhat delays the transmission of the impact of the side crash to the seat 2. As the piston rod 5b is pushed out in the lateral direction, the seat 2 which is connected to the piston rod 5b accelerates laterally toward the center of the vehicle body (see FIG. 4) at a higher level than the vehicle body itself.

Meanwhile, the vehicle occupant 1 in the seat 2 is somewhat delayed in accelerating inward because of its own inertia with respect to the seat which accelerates toward the center of the vehicle body. But, a tension is produced in the armpit belt 17 passed around the upper part of the vehicle occupant, and the armpit belt 17 restrains the upper part of the vehicle occupant from moving toward the door.

As the piston rod 5b is pushed out even further, the retaining part abuts the front end of the collapsible tube 7. Engaged by the retaining part 12 which is moving toward the central part of the vehicle body along with the seat 2, the collapsible tube 7 undergoes a plastic deformation, and the resulting reaction load causes a deceleration to the seat 2 or a force directed opposite to the traveling direction D of the vehicle E (see FIG. 5).

Thus, the tension property of the armpit belt 17, the stress property of the collapsible tube 7 and the dimension of the gap (A) are determined in such a manner that the seat 2 decelerates as it moves toward the central part of the vehicle body and upon completion of the movement of the seat the velocity (deceleration) of the vehicle occupant coincides with the speed (deceleration) of the vehicle body B.

Once the deformation stroke of the collapsible tube 7 has been exhausted and the movement of the seat 2 toward the central part of the vehicle body has been completed, the deformation of the door and side sill may continue as they are pushed by the colliding vehicle E, but because the vehicle occupant 1 is held integrally with the seat 2 and vehicle body B, the acceleration acting upon the vehicle occupant can be kept sufficiently low, if the vehicle structure is designed in such a manner that the reaction load produced by the vehicle body B remains constant until immediately before the vehicle comes to a complete stop. Furthermore, because the seat 2 has already moved to a position adjacent to the central part of the vehicle body before the deformation of the door into the passenger compartment starts, and a relatively wide space is provided between the vehicle occupant and the inner surface of the door, the injury to the vehicle occupant which could be caused by the collision with the door can be substantially reduced. For the principle of controlling the maximum acceleration acting on the vehicle occupant, reference should be made to the prior patents (patent applications) mentioned above which are directed to the arrangement for reducing the impact of a frontal crash on the vehicle occupant.

Figure 6:
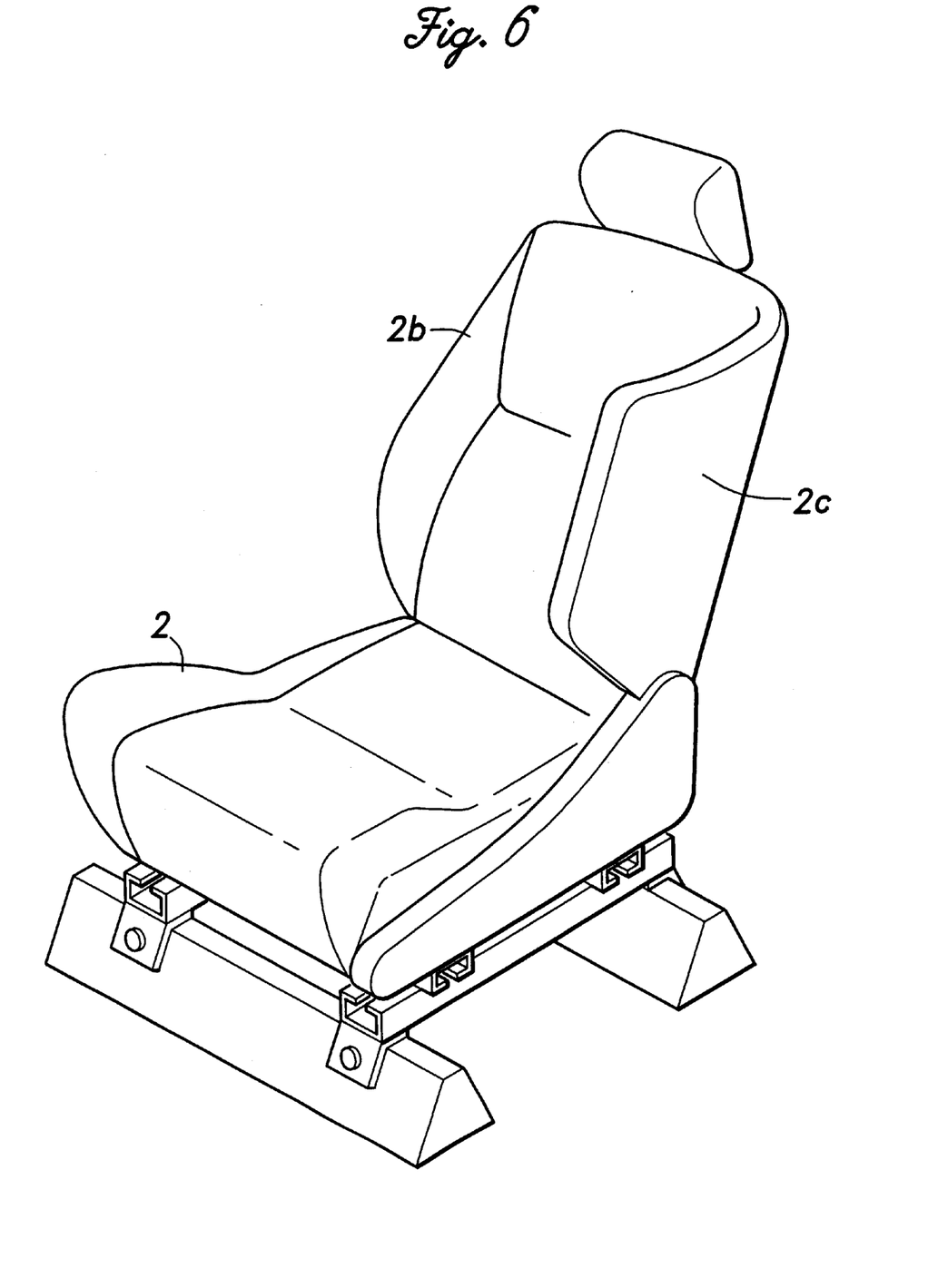
FIG. 6 is a perspective view of an alternate arrangement for the seat.
Figure 7:
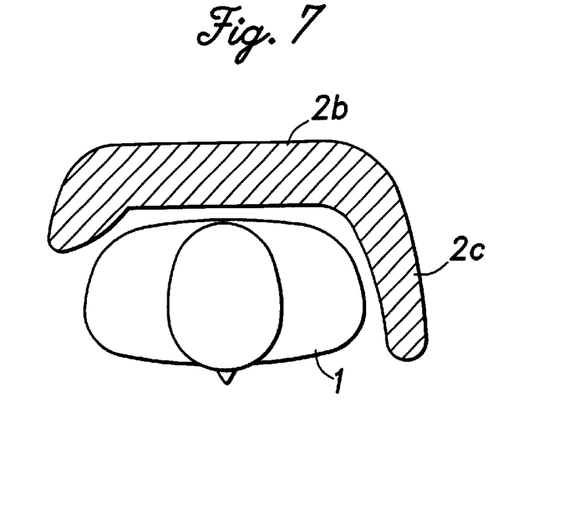
FIG. 7 is a horizontal sectional view of the seat back of the seat illustrated in FIG. 6.

As a means for restraining the lateral movement of the vehicle occupant, instead of using an armpit seat belt 17, the seat back 2b may be provided with an extension 2c extending forwardly therefrom so as to wrap around the shoulder of the vehicle occupant 1 from sideways as shown in FIGS. 6 and 7. The energy storing means for applying acceleration to the seat 2 is not limited to the gas generator 6 described above but may also consist of spring means which is retained in a compressed state by solenoid means or the like.

Thus, according to the present invention, the impact acting on the vehicle occupant at the time of a vehicle crash can be substantially reduced by accelerating the seat to which the vehicle occupant is restrained in the traveling direction of the oncoming vehicle during an early phase of the crash, and decelerating the seat so as to reduce the difference in speed between the vehicle body and vehicle occupant during an intermediate phase of the crash. This, combined with the increase in the space between the door and vehicle occupant by moving the seat toward the central part of the vehicle body so as to prevent the vehicle occupant from hitting the door, makes a substantial contribution in improving the protection of the vehicle occupant at the time of a side crash.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle occupant protection system, comprising
   a seat fitted with a seat belt for restraining a vehicle occupant and laterally moveably supported by a floor, said seat belt having two ends attached to the seat;
   a power actuator for accelerating the seat laterally toward a central part of the vehicle body upon detection of a side crash; and
   brake means for applying an opposite force to the seat after it has traveled a certain distance toward the central part of the vehicle body.

2. A vehicle occupant protection system according to claim 1, wherein the seat is provided with a restraining member for restraining the vehicle occupant from moving laterally outwardly with respect to the vehicle body.

3. A vehicle occupant protection system according to claim 2, wherein the restraining member comprises a belt having an end attached to an upper part of a seat back toward the central part of the vehicle body.

4. A vehicle occupant protection system according to claim 2, wherein the restraining member comprises an extension of a seat back extending forward from an outboard side thereof.

5. A vehicle occupant protection system according to claim 1, wherein the brake means comprises a member adapted to undergo a controlled deformation by a part of the seat as it travels toward the central part of the vehicle body.

6. A vehicle occupant protection system according to claim 1, wherein the seat is supported by the floor via a laterally extending rail which is in turn guided by a longitudinally extending rail attached to the floor for a fore-and-aft adjustment of the seat.

7. A vehicle occupant protection system according to claim 6, wherein the power actuator is attached to the floor, and has a working end connected to the seat via a coupling for accommodating the fore-and-aft adjustment of the seat.

8. A vehicle occupant protection system according to claim 1, wherein the power actuator comprises a piston-cylinder arrangement powered by a propellant.

* * * * *